United States Patent
Yin et al.

(10) Patent No.: US 10,000,637 B2
(45) Date of Patent: Jun. 19, 2018

(54) COMPOSITION AND PROCESS FOR MAKING FINE DENIER POLYAMIDE FIBER

(71) Applicants: BASF SE, Ludwigshafen (DE); BASF Auxiliary Chemicals Co. Ltd., Shanghai (CN)

(72) Inventors: Gary Yin, Pudong (CN); Yanping Wang, Songjiang (CN); Jianhua Ni, Songjiang (CN)

(73) Assignees: BASF SE, Ludwigshafen (DE); BASF Auxiliary Chemcials Co., Ltd., Shanghai (CN)

( * ) Notice: Subject to any disclaimer, the term of this patent is extended or adjusted under 35 U.S.C. 154(b) by 0 days. days.

(21) Appl. No.: 14/896,164

(22) PCT Filed: May 27, 2014

(86) PCT No.: PCT/IB2014/061735
§ 371 (c)(1),
(2) Date: Dec. 4, 2015

(87) PCT Pub. No.: WO2014/195823
PCT Pub. Date: Dec. 11, 2014

(65) Prior Publication Data
US 2016/0115316 A1    Apr. 28, 2016

(30) Foreign Application Priority Data

Jun. 6, 2013 (WO) ................ PCT/CN2013/076879

(51) Int. Cl.
| | |
|---|---|
| *C08L 25/14* | (2006.01) |
| *C08L 77/00* | (2006.01) |
| *D01F 1/10* | (2006.01) |
| *D01F 6/90* | (2006.01) |
| *C08L 77/02* | (2006.01) |
| *C08L 77/06* | (2006.01) |
| *D01D 1/02* | (2006.01) |
| *D01D 1/04* | (2006.01) |
| *D01D 5/08* | (2006.01) |

(52) U.S. Cl.
CPC ............... *C08L 77/00* (2013.01); *C08L 77/02* (2013.01); *C08L 77/06* (2013.01); *D01D 1/02* (2013.01); *D01D 1/04* (2013.01); *D01D 5/08* (2013.01); *D01F 1/10* (2013.01); *D01F 6/90* (2013.01)

(58) Field of Classification Search
CPC .......... C08L 25/14; C08L 77/02; C08L 77/06; D01F 1/10; D01F 6/90; D01D 5/08
USPC ................ 264/176.1; 524/323, 514; 525/183
See application file for complete search history.

(56) References Cited

U.S. PATENT DOCUMENTS

2008/0044654 A1\* 2/2008 Cadoret ................ B82Y 30/00 428/394
2009/0182070 A1\* 7/2009 Miyazono ................ D01F 1/09 523/523

FOREIGN PATENT DOCUMENTS

| CN | 1259533 A | 7/2000 |
|---|---|---|
| CN | 1995075 | 7/2007 |
| CN | 101139749 | 3/2008 |
| CN | 101333693 | 12/2008 |
| JP | 2001-207327 | 8/2001 |
| WO | WO-02/055768 | 7/2002 |
| WO | WO-2005/095685 | 10/2005 |

OTHER PUBLICATIONS

"PCT International Search Report in PCT/IB2014/061735", dated Feb. 26, 2015, 4 pages.
PCT International Search Report in PCT/IB2014/061735, dated Feb. 26, 2015, 4 pages.

\* cited by examiner

*Primary Examiner* — Edward J Cain
(74) *Attorney, Agent, or Firm* — Servilla Whitney LLC

(57) ABSTRACT

A composition for making polyamide fiber comprises: (a) about 85 to about 99.9% by weight, preferably about 90 to about 99.5% by weight, more preferably about 95 to about 99.5%, such as about 95 to about 99% by weight of a polyamide, based on the total weight of the composition; (b) about 0.1% to about 15% by weight, preferably about 0.1% to about 10% by weight, more preferably about 0.5% to about 5%, such as about 1 to about 5% by weight of one or more thermoplastic polymers, based on the total weight of the composition, wherein the thermoplastic polymer in the composition is miscible with component (a). A process for making a polyamide fiber uses the composition of the invention.

14 Claims, No Drawings

COMPOSITION AND PROCESS FOR MAKING FINE DENIER POLYAMIDE FIBER

CROSS-REFERENCE TO RELATED APPLICATIONS

This application is the National Stage entry of PCT/IB2014/061735, filed on May 27, 2014, which claims priority to International Application Number PCT/CN2013/076879, filed on Jun. 6, 2013, which is incorporated herein by reference in their entireties.

FIELD OF THE INVENTION

The present invention relates to a process for preparing a polyamide fiber and a composition used therein. In particular, the invention relates to a process for preparing a fine denier polyamide fiber and a composition used therein.

BACKGROUND OF THE INVENTION

Fine denier fiber has advantages of being fine and soft, having silky hand-feeling, delicate color and strong fabric coverage as compared with ordinary fibers. Imitation silk made from fine denier fiber has soft hand feeling and gorgeous appearance, and is an excellent material for making top-grade full dresses, top grade down coats, shirts and underlinens. Therefore, the study on fine denier fiber is of great economic interest.

At present, fine denier fiber has been one of the leading products of "new synthetic fibers". Efforts have been made to study terylene fine denier fiber, polypropylene fine denier fiber, and acrylic fine denier fiber have been greatly developed, and the productions thereof are industrialized Nylon (polyamide, PA) is more hydrophilic, moisture-absorbing, gas permeable and has better affinity to skin, as compared with terylene fiber and polypropylene fiber. However, there are great deal of hydrogen bonds in the molecular structure of Nylon (polyamide, PA), such that it has high crystallinity, is crystallizable easily, and has low tensile deformation level during spinning. Therefore, it is difficult to produce fine denier polyamide fiber by direct melt-spinning. Fine denier Nylon fiber has been produced by composite spinning processes, and the obtained fibers have good properties. For example, Chinese patent CN101333693B provides a method for producing a fine denier polyamide staple fiber, by which a fine denier Nylon fiber having mono-filament linear density of 0.05-0.3 dtex may be obtained, with spinning speed of about 300 to 800 m/min. However, the composite spinning processes have following disadvantages. Firstly, the spun bi-component fiber should be retreated by an alkali solution or an organic solvent to obtain the fine denier fiber, thus the process is complicated as compared with direct melt-spinning; secondly, it is difficult and costly to recover polymer dissolved by the alkali solution or the organic solvent during the re-treatment, thus the production cost increases greatly and it is possible to cause environmental problem during emission; thirdly, a specific spinning assembly is needed during spinning, thus the process is complicated.

Currently there are few methods for producing fine denier fiber via direct melt-spinning. Chinese patent CN 101139749B discloses a method for producing a fine denier Nylon fiber having mono-filament linear density less than 1 dtex by modifying Nylon with metallic compound followed with direct melt-spinning. However, though this method can obtain a fine denier Nylon fiber having mono-filament linear density less than 1 dtex, it has following deficiencies. Firstly, the method achieves its purpose by incorporating metallic compound masterbatch into Nylon matrix. As the amount of the masterbatch increases, the metallic compound will aggregate to conglomeration, whereby the spinneret is plugged, and fibers can not flow out smoothly, thus the filament fluffiness and fiber breakage are increased, and the strength of the obtained fiber will be dropped greatly (Chaowei HAO, process for producing fine denier porous Nylon 6 elastic fiber, synthetic fiber industry, 2011, 34 (6): 41-43). Secondly, because of the conglomeration of the metallic compounds in the polyamide melt, the incorporated amount of the metallic compound masterbatch and the spinning speed are restricted, which further influences the modifying effect on polyamide. For example, the article "process for producing fine denier porous Nylon 6 elastic fiber" (Chaowei HAO, etc., China Synthetic Fiber Industry, 2011, 34(6), p.41-43) points out that the fiber properties will be best when mass percentage of rare earth in the fiber is 0.08% and the spinning speed is 3800 m/min. A related document (Chunhua GUO, New Fine Denier Nylon Fiber Attract Much Attention, Textile and Apparel Weekly, 2010, 6:32) reports that the mono-filament linear density of the fine denier Nylon fiber mass produced by this technology only reaches to 0.6dtex, thus this process can only obtain the fine denier Nylon fiber having linear density of 0.6dtex-1 dtex.

Therefore, all these mentioned technologies can not reasonably obtain fine denier Nylon fiber. There is a need to find feasible and effective new means for producing fine denier Nylon fiber.

SUMMARY

To remove the deficiencies in the prior art, the present invention provides a composition for making fine denier polyamide fibers and a new process using the same for making fine denier polyamide fibers. The composition and process of the invention improve the flowability of the polyamide materials by adding an additive, such that the linear density of the resultant polyamide fiber is decreased greatly, without deteriorating the fiber strength. Especially, in some preferred embodiments of the invention, the process of the invention may obtain fine denier polyamide fibers having linear density in the range of 0.4-0.8 dtex, with high fiber strength being maintained. The present invention eliminates the degradation of the polyamide during the production of the fiber while keeps high strength of the fiber.

The present invention uses a thermoplastic polymer in making fine denier polyamide fiber to attain the above mentioned purpose. In particular, the process of present invention obtains polyamide fibers having low linear density and high mechanical properties, like strength, by using a composition comprising a thermoplastic polymer during the process.

DETAILED DESCRIPTION OF THE INVENTION

Generally, the present invention relates to a composition for making polyamide fibers, and a process for making polyamide fibers using the composition.

Unless defined otherwise, all technical and scientific terms used herein have the same meaning as commonly understood by one of ordinary skill in the art to which this invention belongs.

Expressions "a", "an", "the", when used to define a term, include both the plural and singular forms of the term.

In present invention, when used, the expressions "Nylon", "polyamide", and "PA" are used inter-changeable.

The term "polymer", as used herein, includes both homopolymers, that is, polymers prepared from a single reactive compound, and copolymers, that is, polymers prepared by reaction of at least two polymer forming reactive, monomeric compounds.

Though polyamide will also be a thermoplastic polymer, the term "thermoplastic polymer", when used herein, does not equal to the polyamide of the composition of the invention. The term "thermoplastic polymer" in present invention is used independently and separately from the term "polyamide".

The term "(meth)acrylate" includes both "acrylate" and "methacrylate".

The term "miscible" refers to a homogeneous mixture of two polymers, that is a mixture when solidified that is lacking in identifiable regions or occlusions of one polymer in the other polymer. In the first aspect of the invention, the present invention relates to a composition for making polyamide fiber, comprising (a) about 85 to about 99.9% by weight, preferably about 90 to about 99.5% by weight, more preferably about 95 to about 99.5%, such as about 95 to about 99% by weight of a polyamide, based on the total weight of the composition, (b) about 0.1% to about 15% by weight, preferably about 0.1% to about 10% by weight, more preferably about 0.5% to about 5%, such as about 1 to about 5% by weight of one or more thermoplastic polymers, based on the total weight of the composition, wherein the thermoplastic polymer in the composition is miscible with component (a).

Component (a) of the composition is a polyamide. Generally, any type of polyamide useful for forming fibers may be suitable as component (a), such as aliphatic and aromatic polyamides, for example polyamides obtained by condensing an aliphatic or aromatic dicarboxylic acid having 4 to 12 carbon atoms and an aliphatic or aromatic diamine having 2 to 12 carbon atoms. The polyamide suitable for the composition of the invention may be obtained by any polymerization process known to a skilled person in the art. For example, polyamide may be produced by the process disclosed in CN1259533A (herein incorporated by reference in entirety).

Aliphatic dicarboxylic acids suitable for use in the synthesis of polyamides for use herein includes, but not limit to, adipic acid, pimelic acid, azelaic acid, suberic acid, sebacic acid and dodecane dioic acid. Aromatic dicarboxylic acids include, but not limit to: phthalic acid, isophthalic acid, terephthalic acid, and naphthalene dicarboxylic acid.

Representative aliphatic diamines include, by way of example, alkylenediamines, such as hexamethylenediamine and octamethylenediamine. Suitable aromatic diamines for example are the following: diaminobenzenes, such as 1,4-diaminobenzene, 1,3-diaminobenzene, and 1,2-diaminobenzene; diaminotoluenes, such as 2,4-diaminotoluene, 2,3-diaminotoluene, 2,5-diaminotoluene, and 2,6-diaminotoluene; ortho-, meta-, and para-xylene diamines; ortho-, meta-, and para-2,2'-diaminodiethyl benzene; 4,4'-diaminobiphenyl; 4,4'-diaminodiphenyl methane; 4,4'-diaminodiphenyl ether; 4,4'-diaminodiphenyl thioether; 4,4'-diaminodiphenyl ketone; and 4,4'-diaminodiphenyl sulfone.

Mixtures of the foregoing aliphatic and aromatic dicarboxylic acids and diamines may be used as well. It is also possible to produce the polyamide from acid derivatives and amine derivatives, such as an acid chloride and an amine salt, as well as by self-condensation of a lactam or a ω-aminocarboxylic acid. Examples of such lactams include ε-caprolactam and ω-laurolactam. Examples of such ω-amino acids include 11-aminoundecanoic acid, 12-aminododecanoic acid, 4-am inophenylcarboxyl methane, 1-(4-aminophenyI)-2-carboxyl ethane, 3-(4-aminophenyI)-1-carboxyl propane, para-(3-amino-3'-hydroxy)dipropyl benzene, and the like.

The aromatic polyamides include, but not limit to, polyxyleneadipamide; polyhexamethyleneterephthalamide; polyphenylenephthalamide; polyxyleneadipamide/hexamethyleneadipamide; polyesteramide elastomer; polyetheramide elastomer; polyetheresteramide elastomer; and dimeric acid copolymerized amide.

The aliphatic polyamides suitable for present invention include, but not limit to: polycaprolactam (PA-6); poly(hexamethylene adipamide) (PA-6,6): PA-3,4; PA-4; PA-4,6; PA-5,10; PA-6; PA-6,6; PA-6,9; PA-6,10; PA-6,12; PA-11; and PA-12. Preferred polyamides are the aliphatic polyamides, especially PA 6 or PA 6,6, most preferably PA 6.

Component (b) of the composition may be any thermoplastic polymer other than polyamide, provided that it is miscible in component (a). For example, the component (b) may be a polymer of vinylidene aromatic monomers, such as copolymers of vinylidene aromatic monomers and one or more commoners having functional groups such as carboxylic acid and/or carboxylic acid derivatives.

In a preferred embodiment of the invention, the thermoplastic polymer of the invention is a copolymer of a vinyl aromatic monomer and a (meth)acrylate; preferably the vinyl aromatic monomer is an non-substituted styrene or styrene substituted with one or more groups selected from the group consisting of methyl, ethyl and propyl, more preferably methyl or ethyl; and preferably the alcohol moiety in the (meth)acrylate is derived from $C_1$-$C_{10}$ alkyl alcohol, preferably $C_1$-$C_4$ alkyl alcohol, more preferably methyl alcohol, ethyl alcohol, and propyl alcohol, butyl alcohol, and 2-ethyl hexyl alcohol. In another preferred embodiment of the invention, the thermoplastic polymer of the invention is styrene-(meth)acrylate copolymer.

In some preferred embodiments of the invention wherein the thermoplastic polymer of the invention is a copolymer of a vinyl aromatic monomer and a (meth)acrylate, the molar ratio of vinyl aromatic monomer to (meth)acrylate polymerized into the thermoplastic polymer of the invention may be in the range of about 1:100 to about 100:1, preferably about 1:10 to about 10:1, more preferably about 1:5 to about 5:1, or it is about 1:1.

Preferably, products of ADF series from BASF Auxiliary Chemical Co., Ltd., Shanghai, China are suitable as component (b) of the invention.

In still some preferred embodiments of the invention, preferably, in the copolymer of a vinyl aromatic monomer and a (meth)acrylate of the invention, the amount of monomeric units from (meth)acrylate is in the range of 0 to 60 percent by weight, preferably it is in the range of 0 to 50 percent by weight, more preferably 0 to 35 percent by weight, based on the weight of the copolymer.

In yet other embodiments of the invention, the thermoplastic polymer of the invention is polystyrene, preferably having the weight average molecular weight of 1,500-10,000, preferably 1,500 to 5000, more preferably 3,000 to 5000.

In present invention, the component (b) of the composition of the invention may have any weight average molecular weight suitable for the purpose of the invention, preferably the weight average molecular weight is from about 1,000 to about 20,000, preferably 3,000 or more, more preferably 5000 or more, most preferably 8000 or more, or about 10,000, and about 18,000 or less, more preferably about 15000 or less, or 12000or less, determined by gel permeation chromatography. Also appropriate, in some embodiments, the weight average molecular weight of the component (b) of the composition suitable for the purpose of the invention may in the range of 1,000 to 5000, preferably 1,000 to 3, 000, or 3,000 to 5,000.

The thermoplastic polymer of the invention may be obtained by any polymerization process known to a skilled person in the art, including bulk polymerization, solution polymerization, suspension polymerization and emulsion polymerization. For example, in an embodiment of the invention wherein the thermoplastic polymer of the invention is a styrene-(meth)acrylate copolymer, the copolymer is obtainable in any one of these polymerizations. For example, in the bulk polymerization, the styrene-(meth) acrylate copolymer is obtained by mixing styrene and (meth) acrylate monomers and polymerizing the obtained mixture in the presence of initiator. In solution polymerization, the styrene-(meth)acrylate copolymer is obtained by dissolving styrene and (meth)acrylate monomers into toluene (benzene /methyl alcohol) solution and polymerizing in the presence of initiator (e.g., CN1995075A, herein incorporated by reference in entirety). Except component (b), there is no any other thermoplastic polymer contained in the composition of the invention. That is, all the thermoplastic polymers in the composition of the invention are miscible with component (a).

Optionally, other additives may be used in the composition of the invention, such as antioxidant, antistatic agent, UV-absorbing agent and the like.

Suitable antioxidants include phosphorus based antioxidants, phenolic antioxidants and sulfur based antioxidants. Examples of phosphorus-based antioxidants including a monophosphites and diphosphates, such as, tris(2,4-di-tert-butylphenyl)phosphate (Antioxidant 168) and tris(mono/di-nonylphenyl)phosphate (such as Antioxidant TNP), distearyl pentaerythritol diphosphite; dioctyl pentaerythritol diphosphite; diphenyl pentaerythritol diphosphite; bis(2,4-ditertbutylphenyl) pentaerythritol diphosphite; bis(2,6-di-tert-butyl-4-methylphenyl)pentaerythritol diphosphite, dicyclohexyl pentaerythritol diphosphite; tris(2,4-di-tert-butylphenyl) phosphite; tetrakis(2,4-di-tert-butylphenyl)-4,4'-biphenylene phosphite.

Suitable phenolic antioxidants include, 2,2'-methylenebis (6-tert-butyl-4-methylphenol); 1,1-bis(5-tert-butyl-4-hydroxy-2-methylphenyl)butane; 2,2'-methylenebis(4-methyl-6-cyclohexylphenol); 4,4'-thiobis(6-tert-butyl-3-methylphenol), 2,2-bis(5-tert-butyl-4-hydroxy-2-methylphenol)-4-n-dodecylmercapto-butane, 2,6-di-tert-4-methylphenol; 2,2'-methylenebis(6-tert-butyl-4-ethylphenol); 2,2'-methylene-bis>4-methyl-6-(.alpha.-methylcyclohexyl)phenol; 2,2'-methylenebis(4-methyl-6-nonylphenol); 1,1,3-tris-(5-tertbutyl-4-hydroxy-2-methylphenyl)butane; ethyleneglycol-bis>3,3-bis(3-tert-butyl-4-hydroxyphenyl)butyrate; 1-1-bis(3,5-di methyl-2-hydroxyphenyl)-3-(n-dodecylthio)-butane; 1,3,5-tris(3,5-di-tert-butyl-4-hydroxybenzyl)-2,4,6-trimetylbenzene; 2,2-bis (3,5-di-tert-butyl-4-hydroxybenzyl)dioctadecyl malonate ester; n-octadecyl-3-(4-hydroxy-3,5-di-tert-butylphenyl) propionate, tetrakis-methylene(3,5-di-tert-butyl-4-hydroxyhydrocinnamate)methane (Antioxidant 1010), 3,9-bis-1,1-dimethyl-2-(β-(3-tert-butyl-4-hydroxy-5-methylphenyl) propionyloxy)ethyl-2,4,8,10-tetroxaspiro)5,5-undecane, tris-(3,5-di-tert-butyl-4-hydroxylenzyl)isocyanurate, 2,6-di-phenyl-4-methoxyphenol, and tris-(4-tert- butyl-2,6-dimethyl-3-hydroxybenzyl)-isocyanurate.

Suitable sulfur-based antioxidants include: dilauryl-3,3'-thiodipropionate; dimyristyl-3,3'-thiodipropionate, distearyl-3,3'-thiodipropionate, pentaerythritol-tetrakis-(β-laurylthiopropionate), bis>2-methyl-4-(3-n-alkylthiopropionyloxy)-5-tert-butylphenylsulfide, and 21 mercaptobenzimidazole.

Other suitable antioxidants are, such as, Antioxidant 163.

The antistatic agents suitable for the composition of the invention may be one or more antistatic agents selected from the group consisting of fatty alcohol phosphate, fatty alcohol alkylene oxide ether phosphate salt, fatty alcohol Potassium phosphate, stearic acid mono-glyceride, and polyethylene glycol.

The UV-absorbing agents suitable for the composition of the invention may be one or more UV-absorbing agents selected from the group consisting of organic aromatic substance such as benzotriazoles and benzophenone, zinc oxide and titanium oxide.

The other additives may be incorporated into the composition at any appropriate time during the formation of the composition of the invention.

If present, the amount of the other additives in the composition of the present invention may in the range of 0-10 percent by weight, preferably 0-5 percent by weight, more preferably 0-2.5 percent by weight, such as 0.001 to 1 percent by weight, based on the total weight of the composition.

The composition of the invention may be formed by any suitable method. For example, the component (b) may be added to the rest of the composition before melting the composition; or the component (b) may be added directly to the rest of the composition during the melting of the composition. In an embodiment of the invention, component (b) is added into the whole component (a) of the invention directly. In a preferred embodiment of the invention, component (b) is firstly mixed with a part of component (a) to form an additive masterbatch, and then the additive masterbatch is mixed with the rest of component (a) to form the composition of the invention.

In the additive masterbatch of the invention, the component (b) may be present in any appropriate amount, as long as the amount is sufficient for obtaining the composition of the invention having about 0.1% to about 15% by weight, preferably about 0.1% to about 10% by weight, more preferably about 0.5% to about 5%, most preferably about 1% to about 5% by weight of the component (b) based on the total weight of the composition. Preferably the amount of the component (b) in the additive masterbatch is less than 25% by weight, preferably less than 20% by weight, more preferably less than 15% by weight, based on the total weight of the additive masterbatch.

The additive masterbatch of the invention may be melt-spun directly with additional polyamide into the desired polyamide fiber of the invention.

The present invention also relates to a polyamide fiber obtainable from the composition of the invention.

In the second aspect of the invention, the present invention relates to a process for making a polyamide fiber, comprising the step of spinning the composition of the invention.

The spinning process for making the polyamide fiber of the invention may be any process known in the art, such as melt spinning, dry spinning and the like, provided that the composition used for making the polyamide fiber of the invention contains component (b) according to the invention. In other words, the process of the invention for making the polyamide fiber of the invention comprises the step of spinning the composition of the invention.

Preferably, during the spinning, the temperature of the composition for making the polyamide fiber of the invention may be any suitable value for spinning. For example, it is in the range of 150-310° C., preferably in the range of 250-295° C.; the number of the spinneret may in the range of 1 to 200, with the diameter of 0.1 to 0.6 mm; and the rolling-up speed is in the range of 800 to 10,000 m/min.

Preferably, the process of the invention comprises the steps of:

A. obtaining an additive masterbatch comprising the component (b) and the component (a), wherein in the additive masterbatch, the amount of the component (b) is less than 25%, preferably less than 20% by weight, more preferably less than 15% by weight based on the total weight of the additive masterbatch, and B. melt-blending the additive masterbatch and additional component (a) to obtain the composition of the invention.

The spinning effect will be better if the additive masterbatch is dried before melt-blending the additive masterbatch and additional polyamide. A skilled person will know how to select appropriate temperature and time period for drying. Preferably drying will be performed at a temperature of 50-120° C., for 4-48 hours.

In another aspect of the invention, the present invention relates to use of the composition of the invention for making polyamide fiber.

Furthermore, the composition of the invention is applicable in processes which cause high shear rate during the process, such as processes for making film, processes for injection product and the like. Preferably, the shear rate in the process reaches at least 2000 $s^{-1}$, preferable >5000$S^{-1}$, more preferable >7000$S^{-1}$.

To sum up, the present invention includes the following embodiments.

1. A composition for making polyamide fiber, comprising
    (a) about 85 to about 99.9% by weight, preferably about 90 to about 99.5% by weight, more preferably about 95 to about 99.5%, such as about 95 to about 99% by weight of a polyamide, based on the total weight of the composition,
    (b) about 0.1% to about 15% by weight, preferably about 0.1% to about 10% by weight, more preferably about 0.5% to about 5%, such as about 1 to about 5% by weight of one or more thermoplastic polymers, based on the total weight of the composition,
    wherein the thermoplastic polymer in the composition is miscible with component (a).

2. The composition of embodiment 1, wherein the weight average molecular weight of the thermoplastic polymer is in the range of 1,000 to 20,000, preferably 3,000 or more, more preferably 5000 or more, most preferably 8000 or more, or about 10,000, and about 18,000 or less, more preferably about 15000 or less, or 12000 or less, or such as 1,000 to 5000, preferably 1,000 to 3, 000, or 3,000 to 5,000.

3. The composition of embodiment 1 or 2, wherein the thermoplastic polymer is a copolymer of a vinyl aromatic monomer and a (meth)acrylate; preferably the vinyl aromatic monomer is an non-substituted styrene or styrene substituted with one or more groups selected from the group consisting of methyl, ethyl and propyl, more preferably methyl or ethyl; and preferably the alcohol moiety in the (meth)acrylate is derived from $C_1$-$C_{10}$ alkyl alcohol, preferably $C_1$-$C_4$ alkyl alcohol, more preferably methyl alcohol, ethyl alcohol, and propyl alcohol, butyl alcohol, and 2-ethyl hexyl alcohol.

4. The composition of embodiment 3, wherein the molar ratio of vinyl aromatic monomer to (meth)acrylate polymerized into the copolymer is in the range of about 1:100 to about 100:1, preferably about 1:10 to about 10:1, more preferably about 1:5 to about 5:1, or it is about 1:1.

5. The composition of embodiment 3, wherein the copolymer comprises monomeric units from (meth)acrylate in amount of 0 to 60 percent by weight, preferably 0 to 50 percent by weight, more preferably 0 to 35 percent by weight, based on the weight of the copolymer.

6. The composition of any one of embodiments 1-5, wherein the thermoplastic polymer is polystyrene, preferably having the weight average molecular weight of 1,500-10,000, preferably 1,500 to 5000, more preferably 3,000 to 5000.

7. The composition of any one of embodiments 1-6, further containing one or more of other additives, such as antioxidant, antistatic agent, and UV-absorbing agent.

8. The composition of embodiment 7, wherein the antioxidant is selected from phosphorus based antioxidants, phenolic antioxidants, sulfur based antioxidants and Antioxidant 163.

9. The composition of embodiment 7 or 8, wherein the amount of the other additive in the composition is in the range of 0-10 percent by weight, preferably 0-5 percent by weight, more preferably 0-2.5 percent by weight, such as 0.001 to 1 percent by weight, based on the total weight of the composition.

10. A process for making a polyamide fiber, comprising the step of spinning the composition according to any one of embodiments 1-9.

11. The process of embodiment 10, comprising steps of:
    A. obtaining an additive masterbatch comprising the component (b) and the component (a), wherein in the additive masterbatch, the amount of the component (b) is less than 25%, preferably less than 20% by weight, more preferably less than 15% by weight, based on the total weight of the additive masterbatch,
    B. melt-blending the additive masterbatch and additional component (a) to obtain the composition according to any one of embodiments 1-9, and
    C. spinning the obtained composition.

12. The process of embodiment 11, wherein before step B, the process further comprises the step of: (A1) drying the additive masterbatch obtained from step A.

13. A polyamide fiber made from the composition defined according to any one of embodiments 1-9, or made from the process of any one of embodiments 10-12.

14. Use of the composition of any one of embodiments 1-9 for making polyamide fiber.

15. Use of the composition of any one of embodiments 1-9 in processes which cause high shear rate during the process, such as processes for making film, processes for injection product and the like, with the shear rate preferably of at least 2000 $s^{-1}$, more preferable >5000$S^{-1}$, even more preferable >7000 $S^{-1}$.

16. An article, prepared from the polyamide fiber of embodiment 13.

17. A blend, comprising the polyamide fiber of embodiment 13.

ADVANTAGES OF THE INVENTION

The process of the invention has following advantages:
1. The component (b) can be added to the composition of the invention immediately before spinning.

2. The composition of the invention possesses sufficient melt strength after extruding and quenching that fibers may be prepared therefrom at a high linear rate, suitably at a linear rate of at least 3,000 m/min, preferably at least 3,500 m/min, more preferably at least 4,000 m/min, most preferably at least 5,000 m/min, and even as high as such as 5,500 m/min. And the obtained fiber has a linear density of lower than 1.0 dtex, more preferably lower than 0.6 dtex, even can be for example as low as 0.3 dtex.
3. the composition of the invention can be used directly for melt-spinning to obtain fibers having low linear density, without the loss of the strength. In some preferred embodiments of the invention, the process of the invention may obtain polyamide fibers having linear density in the range of 0.3-0.8 dtex, with high fiber strength being maintained.
4. the composition of the invention has excellent flowability, which protects the pores of the spinneret from plugging, and avoids the filament fluffiness and fiber breakage.
5. The process of the invention does not use basic solutions or organic solvents, thus eliminates the post-treatment of the fibers for removing these basic solutions or organic solvents, and provides a environment-friendly solution for producing fine denier polyamide fiber.

EXAMPLES

The present invention will be further illustrated hereinafter with the reference of the specific examples which are exemplary and explanatory only and are not restrictive.
Materials that were used:
Polyamide (component (a)): high-speed spinning purity PA6 platelets commercially available from Taiwan JiSheng Corp., Taiwan.
Thermoplastic polymer (component (b)): ADF1350, a styrene-(meth)acrylate copolymer, commercially available from BASF Auxiliary Chemical Co., Ltd., Shanghai, China.

Examples 1-3

Several compositions containing polyamide (component (a)) and thermoplastic polymer (ADF1350, component (b)) were made with different amount of ADF1350 showing in following table 1.

TABLE 1

| Example No. | Weight percentage of ADF1350 |
|---|---|
| 1 | 0 |
| 2 | 2 |
| 3 | 2.4 |

In example 1, polyamide was sent in to a screw extruder (Spinboy II, commercially available from Busschaert Engineering,) having zone 1, zone 2, zone 3, zone 4 from inlet to outlet, to form a composition for spinning, wherein zone 1, zone 2, zone 3, zone 4 has temperature of 255° C., 270° C., 270° C., 275° C. respectively. The outlet of the extruder was connected directly to a spinneret. The composition was sent to the spinneret from the outlet of the extruder for spinning. The temperature at spinneret for spinning was 255° C. The pore diameter of the spinneret was 0.6 mm. And the rolling-up speed was 4000 m/min.
In example 2, a mixture of polyamide (component (a)) and ADF1350 (component (b)) was sent in to a screw extruder (Model LTE-26-32, commercially available from Labtech) having zone 1, zone 2, zone 3, zone 4 from inlet to outlet, to form a composition containing 2 wt % component (b) for spinning, wherein zone 1, zone 2, zone 3, zone 4 has temperature of 255° C., 270° C., 270° C., 275° C. respectively. The outlet of the extruder was connected directly to a spinneret. The composition was sent to the spinneret from the outlet of the extruder for spinning. The temperature at spinneret for spinning was 255° C., the pore diameter of the spinneret was 0.6 mm, and the rolling-up speed was 4000 m/min.

The procedure of example 2 was repeated for fibers of example 3, except that the obtained compositions had component (b) (ADF1350) in amounts shown in table 1.

The obtained fibers have properties showing in table 2.

TABLE 2

| Fiber sample of Example No. | Linear Density (dtex) | Tensile strength (cN/dtex) | Elongation (%) |
|---|---|---|---|
| 1 | 1.53 | 2.2 | 30.3 |
| 2 | 0.69 | 3.2 | 17.4 |
| 3 | 0.69 | 3.6 | 17.9 |

It can be seen from data in table 2 that, compared with fibers obtained from PA virgin, linear densities of the fibers spun from compositions of examples 2 and 3 are decreased greatly and the tensile strength of these fibers are improved.

Examples 4-9

In example 4, 15 parts by weight of ADF1350 were mixed with 85 parts by weight of polyamide manually or by a mixer at a temperature below 100° C., with stirring to be homogenous. The obtained mixture was added into a single-screw extruder for melt-blending and extruding. The residence time of the mixture in the extruder was 300 sec. From inlet to outlet of the extruder, the extruder had 10 zones having 150° C., 225° C., 240° C., 240° C., 235° C., 235° C., 240° C., 235° C., 230° C. and 235° C. respectively. The obtained blend from the outlet of the extruder was palletized to form an Additive masterbatch.

The Additive masterbatches of examples 5-9 were produced by the same procedure as example 4, except that the amounts of ADF1350 and polyamide were varied according to those shown in table 3.

Thermoplastic polymer (component (b)) used was ADF1350.

TABLE 3

| Example No. | Polyamide wt % | MB dosage wt % (component (b) wt % in Additive masterbatch) | Spinning speed m/min |
|---|---|---|---|
| 4 | 80 | 20 (15%) | 3550 |
| 5 | 84 | 16 (15%) | 3550 |
| 6 | 87 | 13 (15%) | 3550 |
| 7 | 88 | 12 (20%) | 3800 |
| 8 | 90 | 10 (20%) | 3800 |
| 9 | 89 | 11 (25%) | 5000 |

Each of the obtained additive masterbatch and further polyamide were dried separately in vacuum oven at drying temperature of 90-105° C. for 16-24 hrs, to remove moisture and substances of small molecular weight. In each of examples 4-9, the dried additive masterbatch was mixed with the dried polyamide in the amounts shown in table 3 to obtain a mixture. The obtained mixture was sent in to a screw extruder (Spinboy II, commercially available from Busschaert Engineering) having zone 1, zone 2, zone 3, zone 4 from inlet to outlet, to form a composition containing component (b) in amount as indicated in table 3 for spinning, wherein zone1, zone 2, zone 3, zone 4 has temperature of 255° C., 270° C., 270° C., 275° C. respectively. The outlet of the extruder was connected directly to a spinneret. The composition was sent to the spinneret from the outlet of the extruder for spinning. The temperature at spinneret for spinning was 255° C., the pore diameter of the spinneret was 0.6 mm, and the rolling-up speed was 4000 m/min. The fibers of examples 4-9 were produced.

The obtained fibers had properties shown in following table 4.

TABLE 4

| Fiber sample of Example No. | Linear Density Before Stretch (dtex) | Stretch Ratio | Final Density | Tensile strength (cN/dtex) | Elongation (%) |
|---|---|---|---|---|---|
| 4 | 0.75 | 1.25 | 0.59 | 2.9 | 15.3 |
| 5 | 0.8 | 1.2 | 0.66 | 2.7 | 18.5 |
| 6 | 0.85 | 1.1 | 0.77 | 2.6 | 25.3 |
| 7 | 0.77 | 1.2 | 0.65 | 3.1 | 21.3 |
| 8 | 0.82 | 1.2 | 0.68 | 3.2 | 17.4 |
| 9 | 0.75 | 1.1 | 0.625 | 3.0 | 23.2 |

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about".

It is to be understood that the upper and lower amount, range, and ratio limits set forth herein may be independently combined. Similarly, the ranges and amounts for each element of the invention can be used together with ranges or amounts for any of the other elements. The present invention is not to be limited in scope by the specific embodiments and examples described herein. Indeed, various modifications of the invention in addition to those described herein will become apparent to those skilled in the art from the foregoing description. Such modifications are intended to fall within the scope of the appended claims.

The invention claimed is:

1. A composition for making polyamide fiber, comprising:
   (a) about 85 to about 99.9% by weight of a polyamide, based on the total weight of the composition,
   (b) about 0.1% to about 15% by weight of one or more thermoplastic polymers, based on the total weight of the composition, wherein the thermoplastic polymer in the composition is miscible with component (a); and wherein the thermoplastic polymer is a copolymer of a vinyl aromatic monomer and a (meth)acrylate, and the vinyl aromatic monomer is an non-substituted styrene or styrene substituted with one or more groups selected from the group consisting of methyl, ethyl and propyl; and the alcohol moiety in the (meth)acrylate is derived from $C_1$-$C_{10}$ alkyl alcohol.

2. The composition of claim 1, wherein the weight average molecular weight of the thermoplastic polymer is in the range of 1,000 to 20,000.

3. The composition of claim 1, wherein the molar ratio of the vinyl aromatic monomer to the (meth)acrylate polymerized into the copolymer is in the range of about 1:100 to about 100:1.

4. The composition of claim 1 further comprising one or more of an additive comprising: an antioxidant, an antistatic agent, and an UV-absorbing agent.

5. The composition of claim 4, wherein the antioxidant is selected from the group consisting of: phosphorus based antioxidants, phenolic antioxidants, sulfur based antioxidants and Antioxidant 163.

6. The composition of claim 4, wherein the amount of the additive in the composition is in the range of 0-10 percent by weight, based on the total weight of the composition.

7. A process for making a polyamide fiber, comprising the step of spinning a composition comprising:
   (a) about 85 to about 99.9% by weight of a polyamide, based on the total weight of the composition,
   (b) about 0.1% to about 15% by weight of one or more thermoplastic polymers, based on the total weight of the composition, wherein the thermoplastic polymer in the composition is miscible with component (a); and wherein the thermoplastic polymer is a copolymer of a vinyl aromatic monomer and a (meth)acrylate; and wherein the vinyl aromatic monomer is an non-substituted styrene or styrene substituted with one or more groups selected from the group consisting of methyl, ethyl and propyl; and the alcohol moiety in the (meth)acrylate is derived from $C_1$-$C_{10}$ alkyl alcohol.

8. The process of claim 7, comprising steps of:
   A. obtaining an additive masterbatch comprising the component (b) and the component (a), wherein in the additive masterbatch, the amount of the component (b) is less than 25%, based on the total weight of the additive masterbatch,
   B. melt-blending the additive masterbatch and additional component (a) to obtain the composition, and
   C. spinning the composition of step B.

9. The process of claim 8, wherein before step B, the process further comprises the step of: (A1) drying the additive masterbatch of step A.

10. A polyamide fiber made from the composition defined according to claim 1.

11. The process of claim 7 comprising a high shear rate during the process, with the shear rate being at least 2000 s$^-$.

12. An article, prepared from the polyamide fiber of claim 10.

13. A blend, comprising the polyamide fiber of claim 10.

14. The polyamide fiber of claim 10 comprising a having a linear density in the range of from 0.3 to 0.8 dtex and a tensile strength in the range of from 2.7 to 3.6 cN/dtex.

* * * * *